United States Patent [19]

Kandpal

[11] 4,061,935

[45] Dec. 6, 1977

[54] OVERLOAD PROTECTOR MOUNTING APPARATUS

[75] Inventor: Tara Kandpal, Tecumseh, Mich.

[73] Assignee: Tecumseh Products Company (Compressor), Tecumseh, Mich.

[21] Appl. No.: 646,523

[22] Filed: Jan. 5, 1976

[51] Int. Cl.² .......................................... H02K 11/00
[52] U.S. Cl. ................... 310/68 C; 310/71; 310/91; 339/119 R; 174/52 R; 361/25; 248/221.3
[58] Field of Search ................. 310/68, 68 C, 71, 91, 310/260; 174/52 R, 138 G; 318/473; 339/91, 119; 361/25, 26, 27; 337/112, 186, 414; 248/221.3, 221.4, 222.1

[56] References Cited

U.S. PATENT DOCUMENTS

| 2,710,373 | 6/1955 | Crowell | 318/473 |
|---|---|---|---|
| 2,809,004 | 10/1957 | Kaufman | 174/138 G |
| 3,083,309 | 3/1963 | Brown | 310/68 |
| 3,253,084 | 5/1966 | Taylor | 174/138 G |
| 3,457,442 | 7/1969 | Charton | 310/71 |
| 3,842,297 | 10/1974 | Pleiss | 310/68 C |
| 3,875,439 | 4/1975 | Roach | 310/68 C |
| 3,959,675 | 5/1976 | Lautner | 310/68 C |

*Primary Examiner*—R. Skudy
*Attorney, Agent, or Firm*—Barnes, Kisselle, Raisch & Choate

[57] ABSTRACT

Apparatus for mounting a thermal overload protector to the compressor motor of a hermetically sealed compressor unit. The apparatus includes an arcuate bracket which follows the radial curvature of the stator laminations and which is mounted to the stator end face by bolts simultaneously used to secure the laminations in place. A hollow protector holder made of insulating material is received by a sliding snap-fit on an upstanding plateau in the bracket and is held against rotation therein, the inside of the holder being specifically contoured to receive and hold an overload protector of preselected shell geometry.

13 Claims, 4 Drawing Figures

OVERLOAD PROTECTOR MOUNTING APPARATUS

The present invention relates to thermal overload protectors and, more particularly, to a thermal protector mounting apparatus adapted for use with electric motors, especially compressor motors in hermetically sealed compressor units.

It has heretofore been a well known and accepted practice in the dynamoelectric machine art, particularly in hermetically sealed compressors, to secure an overload protector to a motor stator within the otherwise "vacant" zone or space defined laterally by the stator end turns and the stator periphery, and longitudinally by the stator end face and the free end of the end turns remote from the end face. It is further accepted that the protector should be held firmly in proximity to the winding end turns in a manner to prevent displacement of the protector during transportation and/or operation of the motor. Examples of motors having protectors mounted in the aforementioned manner are shown in Dubberley U.S. Pat. No. 2,909,719 and Tothero 3,127,531, and are also suggested by Eberhart U.S. Pat. No. 3,319,906 in view of Hemphill U.S. Pat. No. 2,682,005 and Brown U.S. Pat. No. 3,083,309. A particular one-way, slip-in variation of such a mounting arrangement and apparatus is shown in Roach U.S. Pat. No. 3,875,439.

It has also been heretofore known in the art that an overload protector may be mounted to the motor stator by means of a suitable clip secured to the stator end face by bolts passing axially through the stator core and otherwise used to retain the stator laminations. See, for example, Crowell U.S. Pat. No. 2,710,373. The assignee of the present application has heretofore marketed a hermetically sealed compressor with an overload protector mounted as described by an arcuate clip secured at its respective ends to the stator end face by lamination bolts, and having a pair of opposing spring fingers extending axially of the end face to resiliently grip and capture the cylindrical shell of an overload protector. Such a clip, fabricated of spring steel, is generally suitable for use with protectors having cylindrical shells, but is not readily adaptable to other shell geometries. Furthermore, such a clip is not suitable for use with so-called "hot can" protector, i.e., a protector which normally has line voltage on its shell, which protector type is often favored in the art.

It is an object of the present invention to provide an apparatus specifically adapted for mounting a conventional thermal overload protector in proximity to an electric motor, which apparatus is economical in manufacture, is readily adaptable to a wide variety of protector shell geometries, is easily replacable and repairable in assembly, and which satisfies the requirements of Underwriters Laboratories (UL) pertaining to such protectors. It is a more specific object of the present invention to provide an apparatus specifically adapted for use in mounting a "hot can" protector.

Those features which are considered to be characteristic of the present invention are set forth in particular in the appended claims. The invention itself, however, together with additional objects, features and advantages thereof, will be best understood from the following description when read in conjunction with the accompanying drawings in which:

Figure 1:
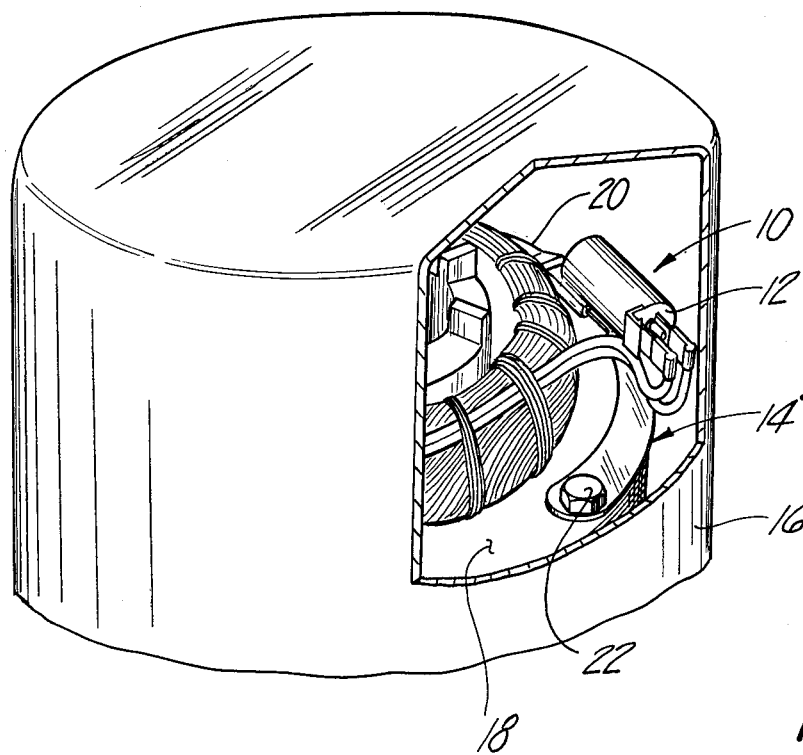
FIG. 1 is a perspective view, partially broken away, showing a hermetically sealed compressor in which an overload protector is mounted to the compressor motor by one embodiment of the apparatus provided by the present invention.

Referring to FIG. 1, one embodiment 10 of the apparatus provided by the present invention is shown as mounting a thermal overload protector 12 to the compressor motor 14 of a hermetically sealed compressor unit 16. Apparatus 10 is mounted to the end face 18 of motor stator 20 by a pair of bolts 22. Preferably, stator 20 is of the "bolted-on" type and thus already is provided with bolts 22 which extends axially through the stator lamination stack to secure the stator laminations to each other and to mount the stator to the compressor cylinder block casting.

Figure 3:
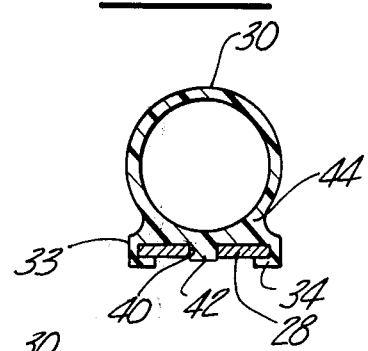
FIG. 3 is a sectional view laterally bisecting the mounting apparatus shown in FIGS. 1 and 2 before insertion of the overload protector therein.
Figure 2:
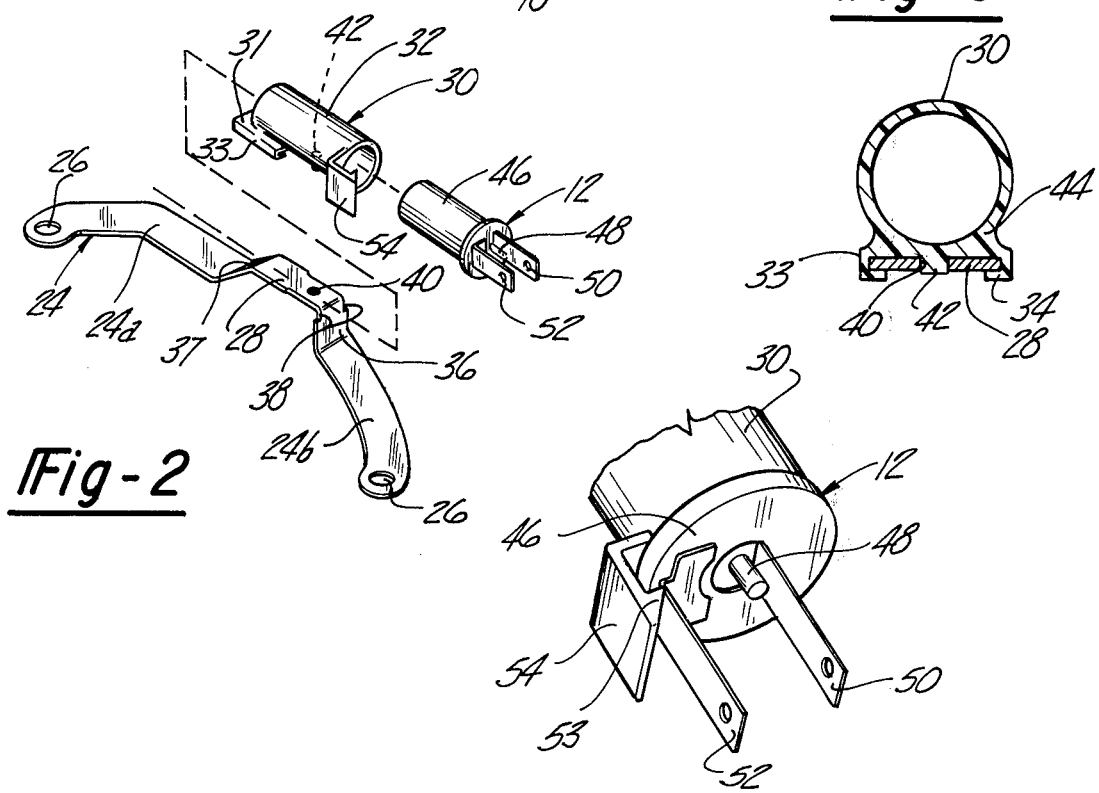
FIG. 2 is an exploded view of the mounting apparatus and overload protector shown in FIG. 1.
Figure 4:
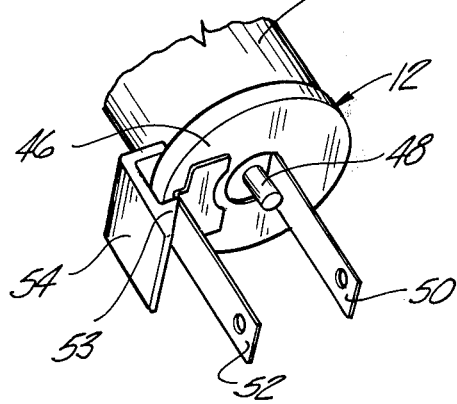
FIG. 4 is an enlarged fragmentary perspective view of a portion of the protector and mounting apparatus shown in FIG. 1.

Referring now to FIGS. 2–4, mounting apparatus 10 includes a bracket 24 comprising a one-piece arcuate strap having two curved coplanar legs 24a, 24b adapted to be seated on end face 18. Bracket 24 is stamped from relatively thin spring steel and has mounting holes 26 at its respective ends through which the stator bolts 22 (FIG. 1) pass. Bracket 24 further includes a raised platform or plateau 28 spaced in assembly from stator end face 18, and upon which a protector holder 30 made of electrically insulating material is slidably received. Platform 28 is disposed intermediate and parallel to legs 24a, 24b, and is joined thereto by upwardly extending connecting portions 36, 37 of the strap. Holder 30 has a flat mounting base portion 31 joined integrally to the underside of its hollow body portion 32. The outer side edges of base 31 are provided with dependent and re-entrant flanges which form two laterally spaced and longitudinally extending ribs 33, 34, each of which defines a groove to slidably receive the associated edge of the bracket platform 28 with a close clearance fit. Platform 28 is reduced in width for about one half of its length to such an extent that the reduced portion of the platform fits between ribs 33, 34. Upright leg 36 is contiguous with the reduced-width portion of platform 28 and includes clearance notches 38 to provide clearance for holder ribs 33, 34 during endwise insertion of holder 30 onto platform 28. Platform 28 also includes a hold 40 into which a corresponding stud 42 on the bottom wall 44 of base 31 is received with a snap-fit when the holder is slid endwise into position onto one end of the platform 28, the holder being thereby positively retained upon the bracket. Although the ribs 33, 34 provide a snug grip of the holder on platform 28 so that it tends to increasingly hug the platform as it is slid therealong, the bottom wall 44 of holder 30 is sufficiently resilient to flex upwardly when stud 42 engages the horizontal top surface of platform 28 and while it is slid therealong until registry with hole 40.

Holder 30 in the illustrated example is in the form of a hollow cylinder open at one end to receive therein a selected overload protector 12. The particular protector 12 depicted in the drawings is of generally cylindrical configuration having a steel can or shell 46 encompassing the side and one end of the protector, and a connection terminal 48 extending axially from the other end thereof. Protector 12 is of the "hot can" type, i.e., it is adapted to conduct current between terminal 48 and shell 46 during normal operation, and to break the connection between the terminal and shell under thermal overload conditions. Spade terminals 50, 52 are respectively welded to terminal 48 and shell 46 to provide for easy electrical connection thereto.

Holder 30 includes an integral spring finger 54 which protrudes generally axially from a holder side wall adjacent the open end thereof and has a cam-catch lip 53 which engages and snaps over the radially protruding end wall of protector 12 to firmly retain the protector within the holder. Protector 12 may thus be quickly inserted into and extracted from holder 30 during both the factory assembly operation and during field maintenance. In the case of a protector 12 having a cylindrical shell geometry, the protector is prevented from rotating about its shell axis by edge-wise abutment of linking finger 54 against spade terminal 52. This feature of the invention maintains the "electrical clearance", i.e., the electrical breakdown distance between protector terminal 52 and stator 20 (FIG. 1), thereby satisfying the pertinent Underwriters Laboratories (UL) requirements. Furthermore, this anti-rotation feature of the invention prevents electrical arc blowout in the protector by orienting the internal contacts and bimetallic elements of the protector with respect to the magnetic field of the associated motor 14 (FIG. 1) such that a collapsing magnetic field in and around the motor, caused by opening of the protector contacts in response to an overload condition, "blows" any electrical energy sparking or arcing across the protector contacts away from the bimetallic element.

The overload protector mounting apparatus thus far described in connection with FIGS. 1-3 has several significant advantages. For example, when holder 30 is fabricated of relatively inexpensive plastic insulating material, and has a wall thickness between 0.030 and 0.040 inch, the mounting apparatus, in assembly, satisfies all of the UL requirements associated with medium sized, hermetically sealed compressors. Specifically, the apparatus embodiment 10 herein described when tested in a 33,000 BTU/hr. compressor of the type shown in FIG. 1 has been found able to withstand a high potential test of approximately 1460 volts and to withstand an 18 day locked rotor test without failure. Furthermore, the mounting apparatus provided by the present invention has been found to be economical, both in fabrication and assembly, and also lends itself to rapid and economic repair both in the factory and in the field. It will also be noted that bracket 24 may be stamped from relatively thin spring stock, as on the order of 0.022 to 0.028 inch thick so that mounting bolts 22 (FIG. 1) need not be lengthened and lamination bolt torque in maintained during dehydration of the hermetic compressor. Moreover, the mounting apparatus, and particularly mounting bracket 24, follows the radial curvature or contour of the motor stator upon which it is mounted and thus need be given little consideration from the standpoint of packaging the compressor unit.

Although the mounting apparatus provided by the present invention has thus far been described in connection with a specific embodiment thereof, it will be evident that, for compressor assemblies and/or for overload protectors of different configuration, modified brackets and/or holders may be provided. Furthermore, it will be evident that, where protectors having noncircular cross sections are used, the holder will complement tab 54 in preventing protector rotation. Accordingly, the present invention is intended to embrace all such alternatives, modifications and variations as fall within the spirit and broad scope of the appended claims.

The invention claimed is:

1. The combination comprising a compressor motor, a thermal overload protector adapted for electrical connection to said motor and means mounting said protector in thermal proximity to said motor, said means comprising a bracket mounted on a surface of said motor and including a raised platform spaced in assembly from said motor surface, said platform having a hole formed centrally therein, and a hollow protector holder having an opening to receive said protection means and a resilient outer wall, said holder further having a stud and a pair of spaced longitudinally extending ribs formed on said wall, said ribs having respective opposed longitudinally extending grooves formed therein, said holder being slidably received onto said platform with corresponding edges of said platform being received by resilient snap-fit into said hold, said holder being specifically contoured to internally receive and retain said protector.

2. The combination set forth in claim 1 wherein said holder further includes an integral spring finger extending axially from said open end to engage a corresponding end of said protector and to firmly retain said protector within said holder.

3. The combination set forth in claim 2 wherein said spring finger engages an axially extending terminal on said protector to prevent rotation of said protector within said holder.

4. The combination set forth in claim 1 wherein said protector comprises a hot can thermal overload protector, and wherein said holder is formed of electrically insulating material.

5. The combination set forth in claim 1 further comprising means hermetically sealing said compressor motor, and wherein said bracket is arcuate and is mounted to an end surface of the stator of said compressor motor.

6. The combination set forth in claim 5 wherein said compressor motor includes stator laminations and bolts securing said stator laminations in place, and wherein said bracket is arcuate and has holes formed at its respective ends, said bracket being mounted on said stator end surface by lamination bolts passing through said bracket holes.

7. The combination set forth in claim 6 wherein said bracket comprises a one-piece arcuate strap comprising two curved coplanar legs adapted to seat flat against said motor surface, said platform being disposed intermediate and parallel to said legs and being joined thereto by upwardly extending connecting portions of said strap, said platform having a portion reduced in width adapted to fit between said ribs and containing said hole, one of the upright legs closest to said hole being bent downwardly from said platform in said reduced width portion to provide clearance notches in the edges of said one leg for endwise reception of said ribs as said holder is being slidably engaged with said platform.

8. Apparatus for mounting protection means to a dynamoelectric machine comprising a bracket adapted to be mounted to a surface of said machine and including a raised platform spaced in assembly from said machine surface, and a hollow holder carried by said platform and having an opening contoured to internally receive said protection means, said holder further including means to retain said protection means within said holder and a pair of spaced ribs longitudinally extending along a wall thereof, said ribs having respective opposed longitudinally extending grooves formed therein, said holder being slidably received onto said platform with corresponding edges of said platform being individually received in said grooves.

9. The apparatus set forth in claim 8 wherein said bracket platform has a hole formed therein, and wherein said holder further includes a stud in registry with and biased by the resiliency of said holder into a snap-fit with said hole.

10. The apparatus set forth in claim 9 wherein said protection means is snugly received internally of said holder, and wherein said holder further includes an integral spring finger extending axially from said open end to engage a corresponding end of said protection means and to firmly retain said protection means within said holder.

11. The apparatus set forth in claim 10 wherein said protector includes means engaged by said spring finger to prevent rotation of said protector.

12. The apparatus set forth in claim 8 wherein said dynamoelectric machine comprises a hermetically sealed compressor including a compressor motor, and wherein said bracket comprises a strap mounted to an end surface of the stator of said compressor motor.

13. The apparatus set forth in claim 12 wherein said compressor motor includes stator laminations and bolts securing said stator laminations in place, and wherein said arcuate bracket has holes formed therethrough individually receiving said bolts to thereby mount said bracket to said motor against said stator end surface.

* * * * *